June 7, 1932. H. D. GEYER 1,861,792
STEERING WHEEL
Filed Dec. 15, 1930  2 Sheets-Sheet 1

Inventor
Harvey D. Geyer
By Spencer Hardman & Fehr
His Attorneys

June 7, 1932.   H. D. GEYER   1,861,792
STEERING WHEEL
Filed Dec. 15, 1930    2 Sheets-Sheet 2

Inventor
Harvey D. Geyer
By Spencer Hardman & Fehr
His Attorneys

Patented June 7, 1932

1,861,792

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed December 15, 1930. Serial No. 502,414.

This invention relates to handwheels, especially such as are suitable for use as steering wheels on automotive vehicles.

An object of this invention is to provide an improved form of steering wheel of high strength and good appearance and which can be economically manufactured in quantity.

A feature of this invention is the metal-reinforced molded composition rim and outer portions of the spokes and the separate metal central portion comprising the hub, the central cup, and the metal inner portions of the spokes which abut and are rigidly clamped to the ends of the molded spoke portions. The molded outer portion of the wheel may be completely finished, that is molded, trimmed, sanded and polished, prior to the attachment thereto of the central metal portion. Thus the operations of molding, trimming, sanding, and polishing are greatly facilitated and simplified due to the entire absence of the central metal portion at that time. Also the central metal portion may be easily completely finished and polished while detached from the molded portion, and since said metal portion does not have to be set within the mold during the molding operation, it of course is not tarnished by said molding operation and hence does not require any further polishing after its assembly upon the molded portion of the wheel.

A more specific feature of the invention is the completely concealed clamping screws which provide a very strong and tight butt joint between the inner and outer portions of the spokes, whereby a tight neat joint can be made without great accuracy in fitting the abutting spoke portions.

Further objects and advantages of the present invention will be apparent from the following description, reference being had to the accompanying drawings wherein a preferred embodiment of one form of the present invention is clearly shown.

In the drawings.

Similar reference characters refer to similar parts throughout the several views.

Figure 4:
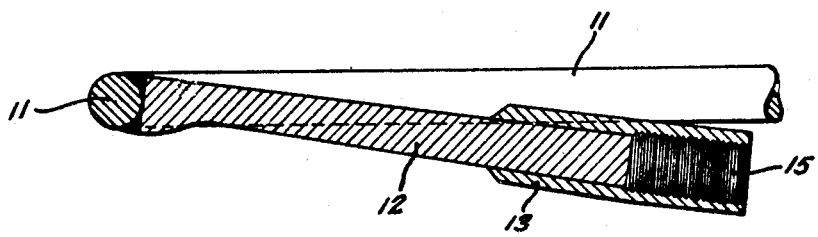
Fig. 4 is a section taken on line 4—4 of Fig. 2.
Figure 2:
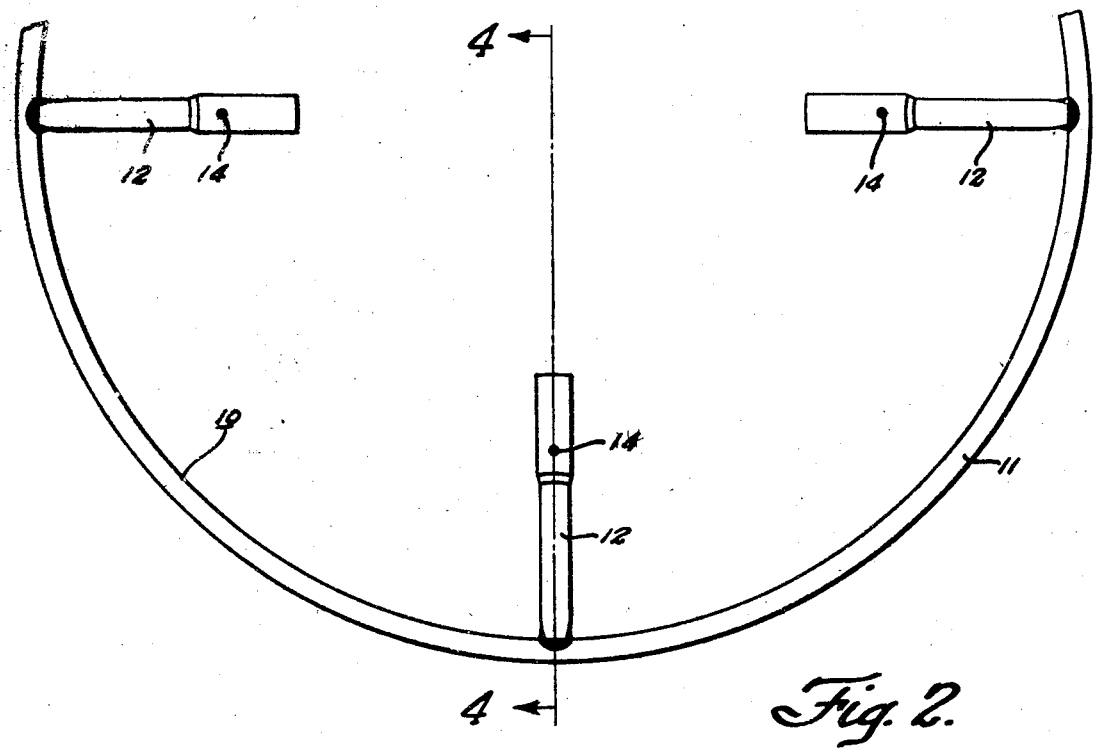
Fig. 2 is a partial plan view of the metal reinforcement for the molded portion of the wheel of Fig. 1.

Numeral 10 designates the metal reinforcement shown in Fig. 2, which comprises an endless metal ring 11, metal arms 12 rigidly welded thereto, and metal sleeves 13 telescoped upon the inner ends of arms 12 and rigidly fixed thereto, preferably by spot welding as shown at 14. Sleeves 13 have internally threaded tubular projections 15 which serve as threaded recesses to receive the screw bolts 16, as more clearly shown in Fig. 4.

Figure 5:
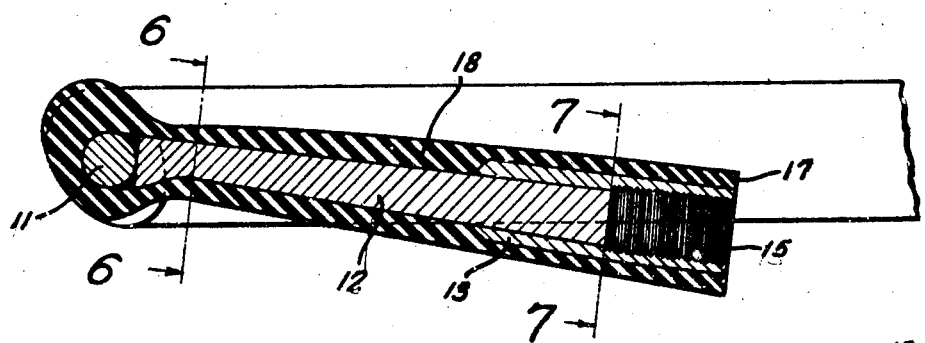
Fig. 5 is a section taken on line 5—5 of Fig. 3.
Figures 6, 7:
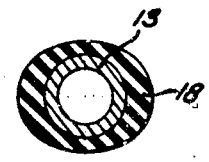
Fig. 6 is a section taken on line 6—6 of Fig. 5.
Fig. 7 is a section taken on line 7—7 of Fig. 5.
Figure 1:
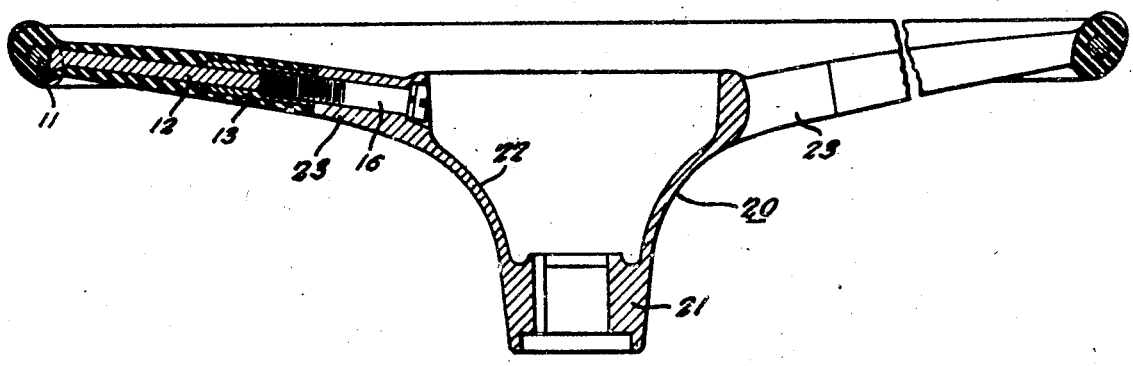
Fig. 1 is a section through an automobile steering wheel made according to this invention.
Figure 3:
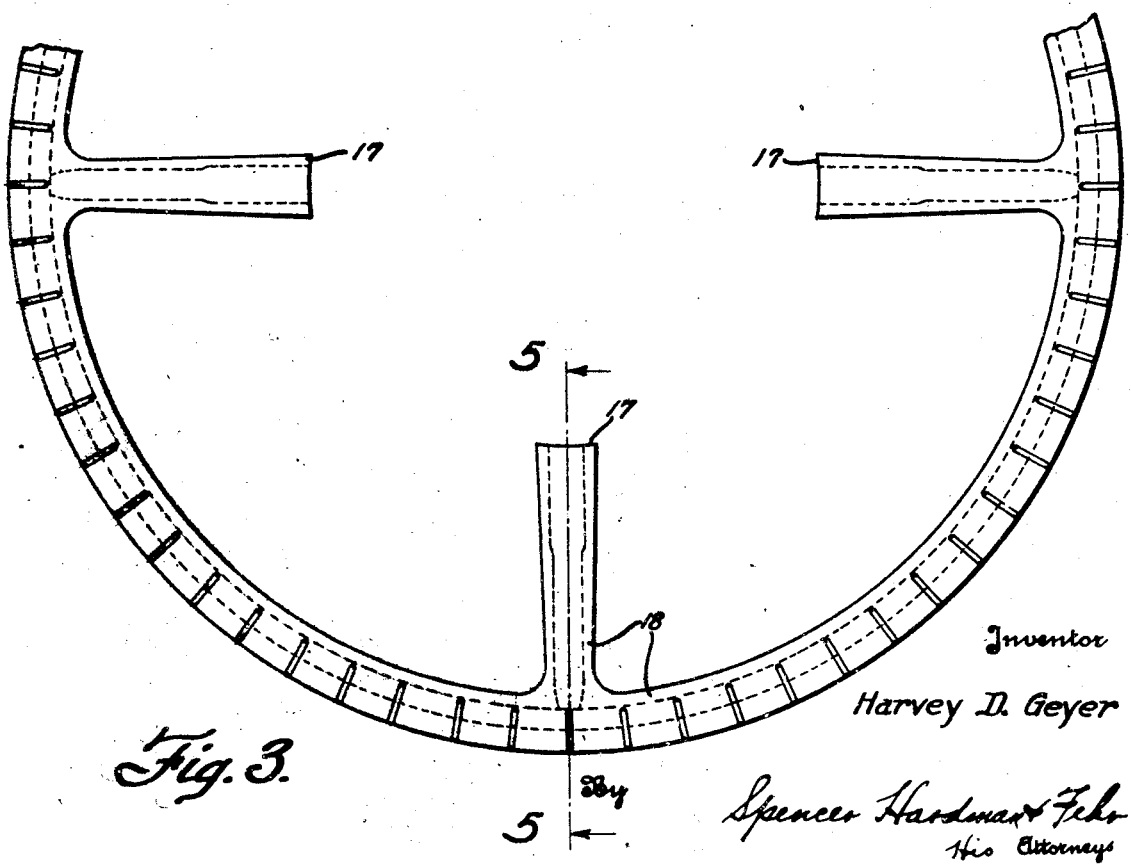
Fig. 3 is a partial plan view of the finished molded portion of the wheel prior to the attachment thereto of the central metal portion.

This metal reinforcement 10 is set within a mold cavity as an insert and properly located therein by suitable pins threaded into the projections 15. The molded composition body 18, such as a hard rubber composition, is vulcanized upon the insert 10 in a well-known manner. This molded portion of the wheel is then removed from the mold and the adhering flash portions of the composition is trimmed off with suitable tools, after which the composition body 18 is preferably sanded and polished to provide a high luster finish. This finished molded portion of the wheel is shown in Figs. 3 and 5. It is obvious that the entire absence at this time of the central metal portion of the wheel greatly facilitates these operations of molding, trimming of the flash, sanding and polishing due to the large open space at the wheel center as shown in Fig. 3. If desired, the inner end surfaces 17 of the molded spoke portions may be machined to provide a more accurate fitting to the abutting metal spoke portions, but this is ordinarily not necessary due to the high clamping pressure obtained by the screw bolts 16.

The separate metal central wheel portion is designated in its entirety by 20 and comprises a hub sleeve 21, a relatively large central cup 22 which is adapted to house actuating mechanism associated with the spark and throttle controls or horn switch, and the complementary spoke portions 23 which correspond to and are adapted to register with the inwardly projecting molded portions of the spokes. This central metal portion 20 may be completely finished and polished prior to its attachment to the molded portion of the wheel. It can therefore be suitably made and shipped directly to the car manufacturer from an entirely separate factory from the factory which makes the molded portion of the wheel. This is rendered feasible since the two finished portions of the wheel can be very simply assembled together without further fitting of any parts by the insertion and screwing home of the four screw bolts 16. These bolts 16 may be easily inserted in place by hand and tightened by a special screw driving tool which can be inserted within the relatively large central cup 22. As stated above, bolts 16 provide a very strong rigid connection and clamp the abutting ends of the spoke portions so tightly together that a very neat joint is obtained without great accuracy of fitting the abutting surfaces. The finished complete wheel gives the appearance of having been molded with the central metal portion in place, such as has been done heretofore.

While the form of embodiment of the present invention as herein disclosed, constitutes a preferred form, it is to be understood that other forms might be adopted, all coming within the scope of the claims which follow.

What is claimed is as follows:

1. A steering wheel comprising: a metal rim ring having radially inwardly projecting metal arms rigidly fixed to said ring, a molded composition body encasing said rim ring and arms and forming a well-appearing molded portion of a steering wheel, a separate metal casting comprising a sleeve adapted to be fixed to a shaft and a central cup having radially extending therefrom several spoke portions which register with said inwardly projecting arms, and separate pins extending radially outward through said spoke portions and into said metal arms; for fixing the outer ends of said spoke portions to the inner ends of said arms after said molded portion is completed.

2. A steering wheel comprising: a metal rim ring having radially inwardly projecting metal arms rigidly fixed to said ring, a molded composition body encasing said rim ring and arms and forming a well-appearing molded portion of a steering wheel, a separate metal central portion comprising a sleeve adapted to be fixed to a steering shaft and a relatively large central cup having extending therefrom several radial projections registering with said inwardly projecting arms, and a screw bolt extending radially outward through each of said projections and into said arms, whereby said separate central portion may be fixed to said molded portion after the molding operation is completed.

3. A steering wheel comprising: a metal reinforced molded composition rim and outer spoke portions, and a separate metal central portion having a hub sleeve adapted to be fixed to a shaft, a relatively large central cup adapted to receive switch mechanism and radially projecting inner spoke portions which register with said outer spoke portions and are rigidly fixed thereto by metal pins inserted radially outward through said inner spoke portions and into said outer spoke portions, said central cup permitting such radial insertion.

4. A steering wheel comprising: a metal reinforced molded composition rim and outer spoke portions, and a separate metal central portion having a hub sleeve adapted to be fixed to a shaft, a relatively large central cup adapted to receive switch mechanism and radially projecting inner spoke portions which register with said outer spoke portions, and threaded bolts extending longitudinally through said inner spoke portions and into said outer spoke portions for rigidly clamping said inner and outer portions together.

5. A steering wheel comprising: a metal reinforced molded composition rim and outer spoke portions, and a separate metal central portion having a hub sleeve adapted to be fixed to a shaft, a relatively large central cup adapted to receive switch mechanism and radially projecting inner spoke portions which register with said outer spoke portions, and threaded bolts extending axially through said inner spoke portions and into the abutting ends of said outer spoke portions, whereby said central metal portion may be easily fixed to the composition covered outer wheel portion after said composition is molded and polished.

6. A steering wheel comprising an integrally molded composition rim and outer spoke portions, a central metal casting having a hub and several radially extending axially apertured inner spoke portions registering with and abutting the ends of said molded spoke portions, and bolts extending through said inner spoke portions and into said outer portions whereby the abutting ends of said inner and outer portions may be tightly clamped together to provide a neat joint.

In testimony whereof I hereto affix my signature.

HARVEY D. GEYER.